US012735766B2

(12) United States Patent
Philipp et al.

(10) Patent No.: US 12,735,766 B2
(45) Date of Patent: Sep. 15, 2026

(54) PROCESS FOR PROCESSING HARD METAL

(71) Applicant: Betek GmbH & Co. KG, Aichhalden (DE)

(72) Inventors: Matthias Philipp, Rottweil (DE); Alexander Haller, Rottenburg (DE); Tobias Hilgert, Schramberg (DE); Manuel Much, Schramberg (DE); David Huber, Schramberg (DE)

(73) Assignee: Betek GmbH & Co. KG, Aichhalden (DE)

( * ) Notice: Subject to any disclaimer, the term of this patent is extended or adjusted under 35 U.S.C. 154(b) by 568 days.

(21) Appl. No.: 18/032,831

(22) PCT Filed: Oct. 8, 2021

(86) PCT No.: PCT/EP2021/077895

§ 371 (c)(1),
(2) Date: Apr. 20, 2023

(87) PCT Pub. No.: WO2022/096223

PCT Pub. Date: May 12, 2022

(65) Prior Publication Data

US 2023/0392231 A1 Dec. 7, 2023

(30) Foreign Application Priority Data

Nov. 4, 2020 (DE) ..................... 10 2020 129 059.4

(51) Int. Cl.
*C22B 9/05* (2006.01)
*C22B 7/00* (2006.01)
(Continued)

(52) U.S. Cl.
CPC ................ *C22B 9/05* (2013.01); *C22B 7/001* (2013.01); *F27B 14/04* (2013.01); *F27D 7/02* (2013.01); *F27D 2007/023* (2013.01)

(58) Field of Classification Search
CPC ........... C22B 9/05; C22B 7/001; C22B 19/04; C22B 34/36; B22F 9/04; Y02P 10/20; C22C 29/02
See application file for complete search history.

(56) References Cited

U.S. PATENT DOCUMENTS 3,449,117 A * 6/1969 Jack .......................... C22B 4/04 55/315
3,595,484 A 7/1971 Barnard et al.
(Continued)

FOREIGN PATENT DOCUMENTS

CN 205897847 U 1/2017
CN 213363333 U 6/2021
(Continued)

OTHER PUBLICATIONS

Notice of Reasons for Refusal English Language Translation, dated Jul. 8, 2025, 5 pages (not prior art).
(Continued)

*Primary Examiner* — Sally A Merkling
*Assistant Examiner* — Nazmun Nahar Shams
(74) *Attorney, Agent, or Firm* — Andrew T. Ball; Lucian Wayne Beavers; Patterson Intellectual Property Law, PC

(57) ABSTRACT

The invention relates to a process for processing hard metal, wherein the hard metal is alloyed with a low-melting alloy metal in a reaction space of a reactor and converted into a vapor phase in the presence of inert gas. The vapor phase is at least partially condensed in a condensation step under an overpressure relative to ambient pressure. In some examples, the inert gas is supplied to the reaction chamber at least temporarily during the condensation phase from an inert gas source external to the reaction chamber and discharged from of the condenser into the environment at least at intervals during the condensation phase. In this way, the
(Continued)

Figure 1:
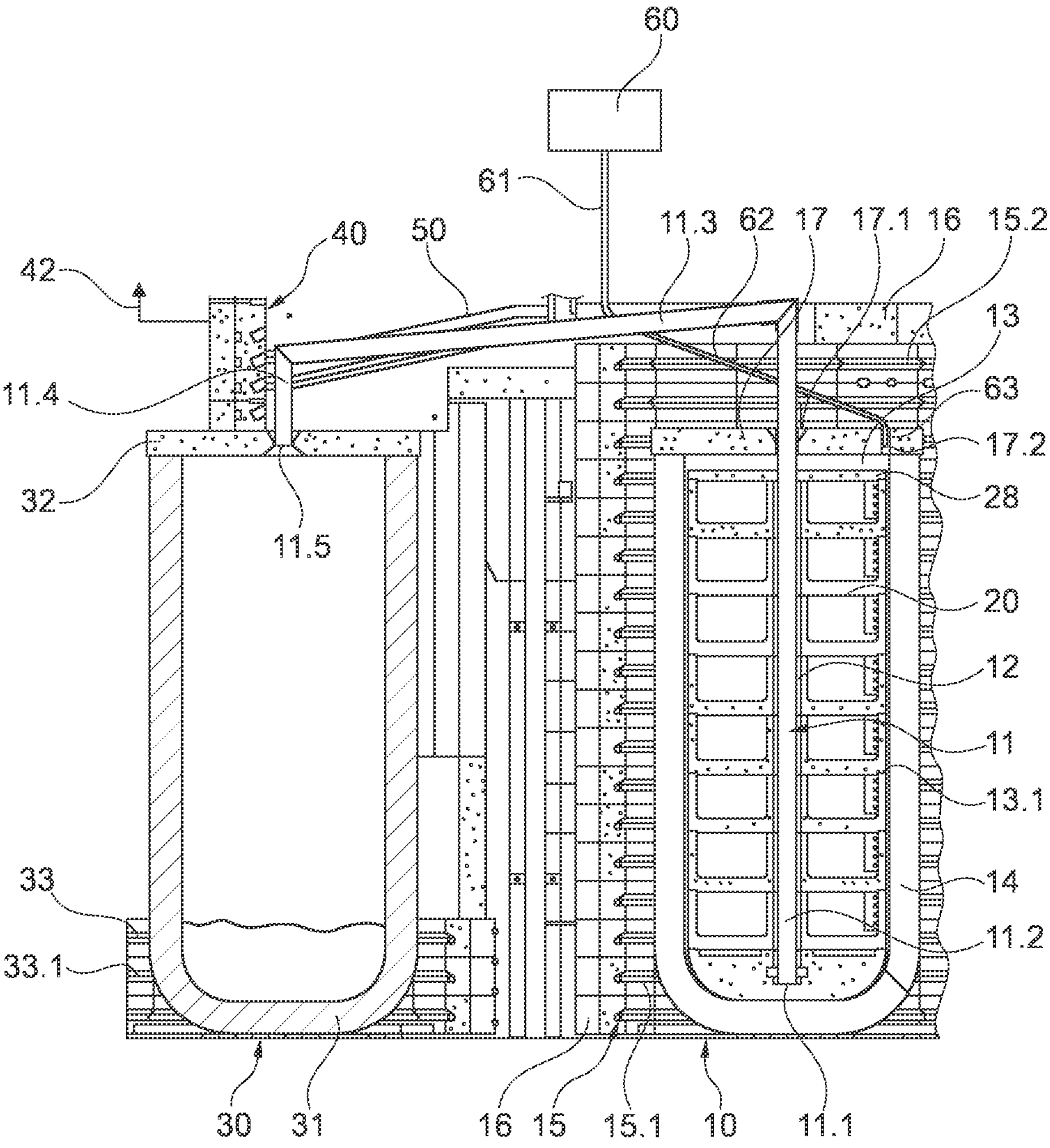

equipment required can be significantly reduced compared to prior art hard metal chemical extraction processes.

15 Claims, 2 Drawing Sheets

(51) Int. Cl.
*F27B 14/04* (2006.01)
*F27D 7/02* (2006.01)

(56) References Cited

U.S. PATENT DOCUMENTS

| | | | |
|---|---|---|---|
| 4,818,282 | A | 4/1989 | Wanetzky et al. |
| 5,098,069 | A | 3/1992 | Wanetzky et al. |

FOREIGN PATENT DOCUMENTS

| | | | |
|---|---|---|---|
| DE | 3144284 | C2 | 10/1988 |
| FR | 2672903 | A1 | 8/1992 |
| JP | 2002030353 | A | 1/2002 |
| JP | 2006037146 | A | 2/2006 |
| JP | 2013019019 | A | 1/2013 |
| KR | 20110029509 | A | 3/2011 |
| KR | 101064868 | B1 | 9/2011 |
| WO | 2016105410 | A1 | 6/2016 |

OTHER PUBLICATIONS

International Search Report for corresponding patent application No. PCT/EP2021/077895, dated Jan. 18, 2022, 6 pages (not prior art).
"Recycling of Tungsten Carbide" by Rod L. Norfleet, Presentation for Society of Mining Engineers of AIME, Oct. 1984, 14 pages.
German Office Action dated Mar. 20, 2021 in corresponding German Application DE 10 2020 129 059. 4 (10 pages) (not prior art).
Janjua, R. A.: Optimization of Electric Arc Furnace Dust Recycling and Zinc Recovery by Scrap De-Zincing, Diss. TU BA Freiberg, 2008.
Wikipedia "Cemented Carbide" ; https://en.wikipedia.org/w/index.php?title=Cemented=carbide&oldid=978646380; (6 pages) (Sep. 16, 2020).
India Office Action for corresponding patent application No. 202347031467, dated Jun. 23, 2026, 7 pages (not prior art).

* cited by examiner

PROCESS FOR PROCESSING HARD METAL

The invention relates to a process for processing hard metal, in particular hard metal scrap, wherein the hard metal is alloyed with a low melting alloy metal in a reaction space of a reactor under supply of heat, wherein the alloy metal is then converted into a vapor phase in the presence of inert gas, and wherein the alloy metal is subsequently condensed in a condensation step.

Such a process is known from DE 31 44 284 C2. To this end, several crucibles are superposed in a receiving space. The crucibles hold the hard metal scrap and zinc material to be processed. The receiving space is sealed from the environment and connected to vacuum lines leading to vacuum pumps. To process the hard metal material, the receiving space is first evacuated to remove the oxygen inside. Subsequently, inert gas, for instance argon, is injected into the receiving space and then the receiving space is heated to melt the zinc material and enters the liquid phase. The zinc material diffuses into the hard metal matrix and reacts with the cobalt of the hard metal material. In this way, the hard metal is alloyed. When the cobalt material reacts with the zinc material, a reaction product is formed, with a significant increase in volume. The increase in volume breaks the bond between the carbide hard material phase and the metallic binder. Subsequently, the zinc can be distilled in a condensation phase and separated in a condenser. For this purpose, the temperature in the receiving space is increased until the zinc evaporates. The vaporous zinc material together with the inert gas flows to a condenser. In the condenser, the zinc material is condensed and the inert gas flows back to the hard metal. It can then absorb zinc vapor again here, resulting in a closed circuit. To be able to maintain this circuit flow, the vacuum pumps are used to set a sensitive pressure gradient between the receiving space, in which the hard metal is received, and the condenser. This requires a considerable amount of equipment. In particular, the sealing of the receiving space and the use and control of the vacuum pumps significantly influence the cost. In addition, a complex system control is necessary. The term “hard metal” is understood to refer to metal carbides such as those discussed in DE 31 44 284 C2, which may include a metal carbide aggregate and a binding agent such as cobalt as a matrix. Such metal carbides are often referred to as cemented carbides.

After the condensation phase has been completed, a porous hard metal structure, which can be ground into a fine powder and then reused, remains in the receiving space. Likewise, the zinc material that is condensed can be used for a renewed recycling process.

The invention addresses the problem of creating a process of the type mentioned at the outset, which can be used to significantly reduce the cost and effort of equipment required .

This problem is solved in that the inert gas is permanently supplied to the reaction space at least temporarily during the condensation phase from an inert gas source disposed outside of the reaction space via an inert gas supply line, and in that the inert gas is discharged from the condenser into the environment at least at certain intervals during the condensation phase.

According to the invention, during the condensation phase the reaction space is therefore permanently flushed with an externally supplied inert gas. In terms of the invention, flushing can be performed continuously throughout the entire condensation phase. However, it is also conceivable that flushing is performed at intervals. It is important to pass externally supplied inert gas over the hard metal to be treated during the condensation phase, wherein the inert gas absorbs the vaporous zinc material. The zinc material can then be routed to the condenser in vapor form and separated therein. The mass flow created by the temperature gradient between the hot end and the cold end is thus supported by the inert gas flow. The inert gas, which is free of zinc material, then leaves the condenser. The inert gas can be expanded to ambient pressure outside the reactor and outside the condenser and released into the environment. It is also conceivable that the inert gas is returned to the reaction space, wherein then the pressure is increased. This can be done, for instance, using a suitable pump. According to the invention, continuous flushing is performed, which is performed at overpressure compared to the ambient pressure in the reaction space. In this way, there is no need for vacuum pumps. There is also no need to meet stringent requirements for sealing the reaction space against the environment, because according to the invention there is no need for operating conditions in a vacuum, i.e. operating conditions in which there is a negative pressure with respect to the environment. In particular, the invention eliminates the initial vacuum formation required in the prior art to remove the oxygen from the reaction space. Rather, according to the invention, inert gas is used to flush the air from the reaction space and removed with the aid of a pressure drop to ambient pressure in a first phase. This can be monitored with an air sensor, in particular an oxygen sensor, for instance. If the reaction space is sufficiently free of oxygen, it can be heated and the hard metal can be alloyed with the alloy material.

According to the invention, provision can be made for the overpressure relative to ambient pressure to be in the range from 1 mbar to 90 mbar. The plant can be safely operated at this pressure.

As mentioned above, provision can be made according to the invention in a flushing phase, for inert gas to be introduced into the reaction space from the inert gas source, wherein the inert gas displaces the air present in the reaction space and this is vented into the environment through a closable opening, and for the opening to be subsequently closed again. A pressure valve can be used to make up the closable opening. In particular, it may be a regulated pressure valve connected to a control device. In this context, provision can be made for an air sensor, for instance an oxygen sensor, to be connected to the control device, wherein a signal pickup of the air sensor is preferably disposed in the reaction space or in the condenser or in another gas-conveying area of the plant.

According to a particularly preferred variant of the invention, provision can be made for the vapor mixture, comprising the inert gas and the zinc vapor, to be discharged from the reaction space via a vapor pipe and routed into the condenser via a heating pipe to which a heater is assigned. This heater, which is assigned to the heating pipe, can preferably be provided and operated separately from the heating device that heats the reaction space. In this way, the heat level in the heating pipe can be directly influenced to reliably prevent or specifically bring about condensation of the zinc in the heating pipe.

A process according to the invention can be designed in such a way that the main amount of zinc is precipitated and collected in the condenser. A separator can be used to separate any residual zinc in the inert gas flow. The separator reliably prevents any zinc material in vapor form from being taken out of the condenser and condensing in downstream plant components. In particular, the separator can be used to perform the, according to the invention, at least phased discharge of the inert gas flow during the condensation phase out of the condenser into the environment. The separated zinc material can either be collected separately or preferably returned to the condenser and supplied to the condensed zinc material previously collected there.

According to a further variant of the invention, provision can be made for one or more receptacles to be disposed in the reaction space, each of which comprises a receiving space for receiving the hard metal, for the receptacles to comprise at least one flow channel or for at least one flow channel to be assigned to the receptacles, for the flow channel to form a spatial connection between the receiving space and a gas-conveying area of the reactor installed outside the receiving space, and for a discharge channel leading out of the receiving space to be provided, such that inert gas is supplied via the at least one flow channel and the inert gas is discharged from the receiving space together with the alloy metal in the vapor phase. This constitutes a considerable advantage over the solution known from the prior art according to DE 31 44 284 C2. In DE 31 44 284 C2, no flow channels are provided, but rather only connecting paths in the form of capillaries. The purpose of these capillaries is to prevent zinc vapor from entering the gas-conveying area from the receiving space. The inventors have recognized that, due to the flow guidance of the inert gas according to the invention, instead of capillaries flow channels can now be provided, through which large volume flows can enter the receiving space. This makes for a much more effective flow into the receiving space. The flow channels are preferably designed in such a way that a line of sight is possible from the receiving space through the flow channels into the area of the gas-conveying area to provide a low flow resistance to the flow.

Within the scope of the invention, provision can also be made in particular for the cross-section of the flow channel to be at least 1 $mm^2$-30 $mm^2$.

The receptacle, the crucible, the vapor pipe, and/or the collection vessel are preferably made of a material inert to zinc vapor, for instance graphite or ceramic.

The receptacles can then be easily manufactured if provision is made for them to comprise a bottom and a perimetral wall rising therefrom, and for the wall to comprise cut-outs at its rim facing away from the bottom, which cut-outs form the flow channels.

According to the invention, provision can also be made for several receptacles to be superposed in such a way that the discharge channels of the receptacles are aligned with one another, and for one line section of the vapor pipe to be routed through the aligned discharge channels, wherein a channel is left between the outer wall of the line section and the discharge channels for discharging the vapor phase of the alloy metal from the receiving space of the receptacle. The vapor pipe facilitates the structural assignment of the individual receptacles to each other. Furthermore, the mixture of inert gas and vaporous zinc conveyed in the channel heats the vapor pipe during the condensation phase, reliably preventing condensation within the vapor pipe. In addition, the chosen arrangement achieves a compact design.

If provision is be made for a line section of the inert gas supply line to open into the upper area of the reaction space, and for a line inlet of the vapor pipe to be disposed in the reaction space at a geodetic height below the opening of the inert gas supply line, then at the beginning of the machining process the air present in the reaction space can be effectively displaced from the reaction space by the targeted gas routing.

The condenser has a simple structure if provision is made for it to comprise a cup-shaped collection vessel, the top of which is closed in a gas-tight manner by a removable cover, and for an end piece of the vapor pipe to be inserted into a lead-through of the cover.

Figure 2:
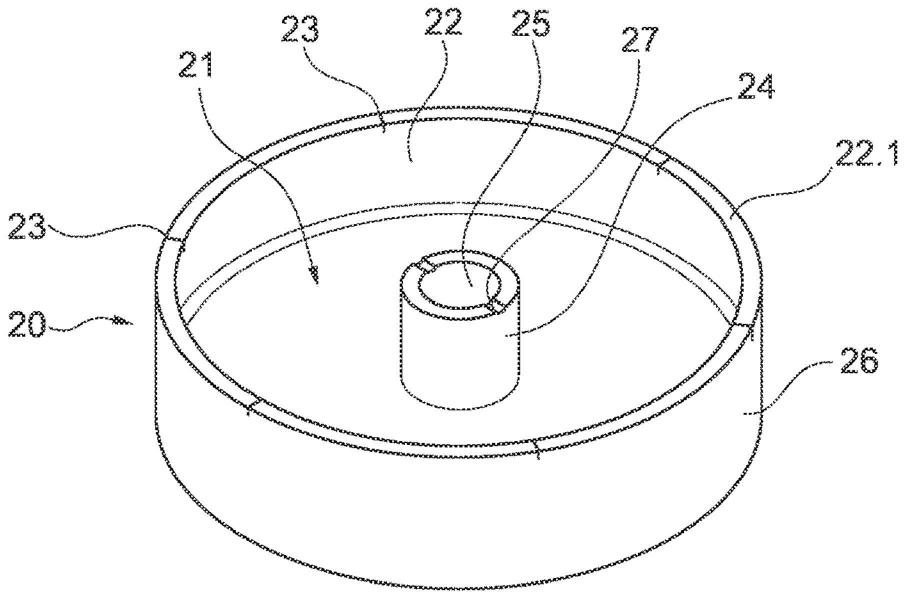
Figure 3:
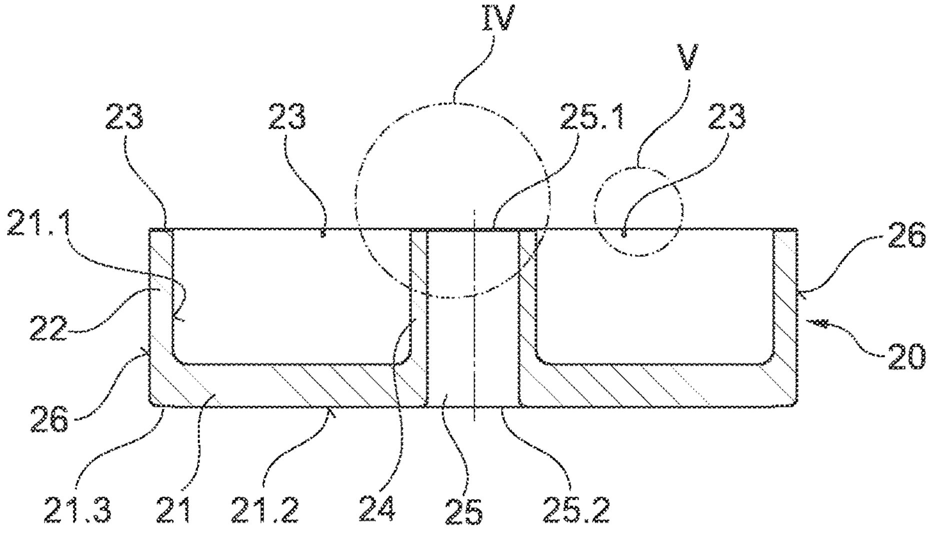
Figure 4:
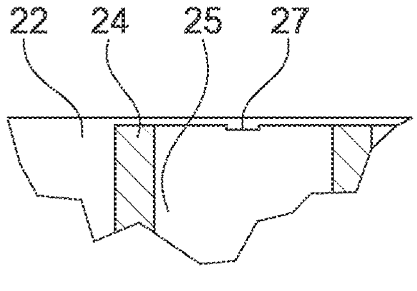
Figure 5:
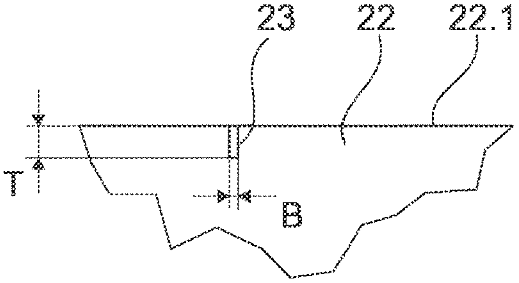

The invention is explained in greater detail below based on an exemplary embodiment shown in the drawings. In the Figures:

FIG. 1 shows a side view and a cross-section of a plant for processing hard metal, FIG. 2 shows a perspective view of a receptacle, FIG. 3 shows a side view and a cross-section of the receptacle of FIG. 2, FIG. 4 shows a detail taken from FIG. 3 marked by IV there and FIG. 5 shows a detail marked by V in FIG. 3.

FIG. 1 shows a processing plant according to the invention, which can be used to process hard metal, in particular hard metal scrap. The processing plant comprises a reactor housing 10 having a crucible 14. The crucible 14 can be shaped like a cup. It comprises a lower bottom from which a wall rises. At its upper end, the crucible 14 forms an opening which can be closed with a cover 17. When the cover 17 is removed, the crucible 14 can be loaded with receptacles 20, as will be discussed in more detail later.

The crucible 14 is encompassed by a heating device 15 having heating elements 15.1 at least in certain areas. The heating elements 15.1 can be formed by known resistance heaters.

The cover 17 comprises a lead-through 17.1, through which a vapor pipe 11 is introduced into the reaction space enclosed by the crucible 14. The vapor pipe 11 may also be referred to as a vapor conduit 11. Furthermore, the cover 17 has a second lead-through 17.2. An inert gas supply line 61 opens out in the area of this second lead-through 17.2. Insulation 16 is provided lateral of the heating device 15, which insulation may consist of firebricks. Further heating elements 15.2 are disposed above the cover 17. Insulation 16, consisting for instance of firebricks, is disposed above these further heating elements 15.2.

The inert gas supply line 61 is routed to and connected to an inert gas source 60. The inert gas source 60 may be, for instance, a high-pressure inert gas reservoir, wherein the inert gas is preferably argon.

A control device not shown in FIG. 1 can be used to control the flow of inert gas delivered by the inert gas source 60 in the inert gas supply line 61. In particular, this control device comprises a pressure reducer and a volume flow controller.

One line section 62 of the inert gas line 61 leads into the reaction space enclosed by the crucible 14. Preferably, as FIG. 1 shows, an end section 63 of the line section 62 is routed through the lead-through 17.2 in the cover 17.

The vapor pipe 11 has a line inlet 11.1, which is located in the area of the bottom of the crucible 14. From this line inlet 11.1, a line section 11.2 is routed vertically upward through the cover 17 out of the reaction space. The line section 11.2 transitions into a heating pipe 11.3. The heating pipe 11.3 is routed to an end piece 11.4 of the vapor pipe 11. The end piece 11.4 has an outlet port 11.5. This outlet port 11.5 opens into a condenser 30.

The condenser 30 is preferably cup-shaped in the form of a collection vessel 31. The collection vessel 31 has a bottom from which a wall rises. In its upper area, there is a cover 32, which closes the collection vessel 31. The end piece 11.4 of the vapor pipe 11 is routed through this cover 32.

As can be seen from FIG. 1, a heating device 33 having one or more heating elements 33.1 is assigned to the collection vessel 30. The heating elements 33.1 are designed as resistance heaters. Laterally, the heating elements 33.1 are covered by an insulation, for instance consisting of fire-bricks.

A heating pipe 11.3 is assigned to the heater 50. This heater 50 encompasses the heating pipe 11.3 at least in some areas and is disposed along at least a part of the length of the heating pipe 11.3. The heater 50 can be used to generate and transfer heat to the heating pipe 11.3.

FIG. 1 further shows that the reactor 10 may comprise a separator 40. This separator 40 is preferably assigned to the condenser 30. The separator 40 is spatially connected to the collection space enclosed by the collection vessel 31. It comprises condensation surfaces, which are not shown in detail in the drawing. These condensation surfaces are part of a guide area of the separator 40. Furthermore, the separator 40 comprises an inert gas discharge line 42.

As described above, receptacles 20 can be superposed in the reaction space of the crucible 14. To this end, the receptacles 20 are dimensioned such that they can be inserted into the reaction space when the cover 17 is removed. Preferably, all receptacles 20 are of identical design to reduce the number of different parts required.

FIG. 2 shows that a receptacle 20 comprises a bottom 21 from which a perimetral wall 22 rises. The wall 22 comprises a rim 22.1, facing away from the bottom 21. Cut-outs are made in the rim 22.1 to form flow channels 23. It is also conceivable that there are apertures in the wall 22 that form the flow channels 23.

The bottom 21 comprises a line section 24 that protrudes from the bottom 21 in the same direction as the wall 22. The line section 24 forms a discharge channel 25 that passes through the receptacle 20, as FIG. 3 illustrates. Thus, the upper end of the discharge channel 25 facing away from the bottom 21 forms a channel opening 25.1. In the area of the bottom 21, another channel opening 25.2 of the discharge channel 25 is provided.

FIG. 4 shows that the channel opening 25.1 is set back from the rim 22.1 in the direction of the bottom 21. FIG. 4 further shows that the upper rim of the line section 24 may be provided with recesses 27.

FIG. 5 shows the cross-section of the flow channels 23. As this embodiment illustrates, the flow channels 23 are preferably in the form of rectangular cut-outs or apertures. They have a width B and a depth T.

The flow cross-section of the flow channels 23 ranges from 1 to including 30 $mm^2$.

The receptacles 20 are preferably made of graphite.

The receptacle 20 has a perimetral inner surface 21.1 and a perimetral outer surface 26. The inner surface 21.1 and the outer surface 26 are spaced apart from each other, resulting in an upper annular rim.

The bottom 21, in conjunction with the inner surface 21.1 and the outer surface of the line section 24, delimits a receiving space.

The underside 21.2 of the bottom 21 has a shoulder 21.3 at the rim. This shoulder 21.3 can be used to stack the receptacles 20 on top of one another aligned with one another. Accordingly, the shoulder 21.3 of an upper receptacle 20 is placed on the rim 22.1 of a receptacle 20 beneath. Thus, the receptacles 20 are secured to each other in the direction of the plane of the bottom 21 in a form-fitting manner.

The receptacle 20 is sealed by a receptacle 20 placed above it, wherein the bottom 21 of the upper receptacle 20 is sealingly seated on the rim 22.1 of the receptacle 20 below. In this way, a receiving space is formed on the receptacle 20 at the bottom, which is spatially connected to the area adjoining the outer surface 26 via the flow channels 23. Furthermore, the discharge channel 25 is used to spatially connect this receiving space to a discharge channel 25 of an upper receptacle 20 disposed on top of that and to a discharge channel 25 of a lower receptacle 20 disposed beneath it. This is made possible in particular because, as FIG. 4 indicates, the upper rim of the line section 24 is slightly recessed and/or because recesses 27 are provided on the line section 24.

As FIG. 1 shows, a plurality of receptacles 20 can be stacked in the reaction space in the manner explained above, wherein the drainage channels 25 of the individual receptacles 20 are interaligned. The bottom 21 of the lowest receptacle 20 rests on a support surface of the crucible 14. A collection area is formed in the crucible below the bottom 21 of the lower receptacle 20, in which the line inlet 11.1 is disposed. A lid 28 can be used to close the upper receptacle 20.

The vapor pipe 11 is routed through the mutually aligned discharge channels 25, as shown in FIG. 1. Then, a remaining cross-section is formed as a channel 12 between the outside of the vapor pipe 11 and the line sections 24, which form the discharge channel 25. The channel 12 may also be referred to as an annular channel 12.

The operating principle of the reactor 10 is explained in more detail below. First, the individual receptacles 20 are filled with the hard metal material to be machined and with zinc material. Then, the receptacles 20 are stacked on top of one another in the reaction space of the crucible 14. The vapor pipe 11 is then inserted into the aligned discharge channels 25 until the line inlet 11.1 is in the area of the bottom of the crucible 14. Then, the cover 17 can be used to close the crucible 14.

A gas-conveying area 13.1 is formed between the outer surfaces 26 of the receptacles 20 and the inner wall of the crucible 14. This gas-conveying area 13.1 is spatially connected to a deck-side supply area 13, into which the inert gas supply line 61 also opens. After the cover 17 is in place and the top-end insulation 16 is applied, the inert gas source 60 is opened. Then, inert gas flows from the inert gas source 60 through the inert gas supply line 61 into the reaction space.

The air in the reaction space is displaced from the top downward, wherein the inert gas flows through the gas-conveying area 13.1 and the flow channels 23 into the receiving spaces of the receptacles 20. In this way, the air is displaced from the receiving spaces and guided through the channel 12 towards the line inlet 11.1 of the vapor pipe 11. Furthermore, the air in the area of the gas-conveying area 13.1 is displaced in the direction of the line inlet 11.1. The air then flows through the vapor pipe 11 into the condenser 30.

The separator 40 has a valve, which is open. Then the air can be displaced from the condenser 30. The air flows out of the separator 40 to the environment via the inert gas discharge line 42 or other discharge.

As soon as the plant has been deaerated, the valve is closed again. The pre-heating phase then begins in a first heating phase. The heating device 15 is used to bring the reaction space to a temperature above the solidus temperature of the zinc material. The zinc material liquefies and diffuses into the hard metal matrix. In this process, the zinc material reacts with cobalt of the hard metal material. When the cobalt material reacts with the zinc material, a reaction product is formed, resulting in a significant increase in volume. The increase in volume breaks the bond between the carbide hard material phase and the metallic binder. This alloying process can take several hours. After the alloying process has been completed, when preferably all cobalt has reacted with the zinc material, the second heating phase occurs. In the second heating phase, the temperature in the reaction space of crucible 14 is further increased to a temperature in which the zinc material is vaporized. If inert gas is routed from the inert gas source 60 via the inert gas supply line 61 into the reaction space, the inert gas flows through the flow channels 23 into the receiving spaces of the receptacles 20. The gas-conveying area 13.1 ensures that all receiving spaces are filled as evenly as possible with inert gas. For this purpose, the sum of the cross-sections of the flow channels 23 is preferably smaller than or equal to the cross-section of the inert gas supply line 61. The inert gas entrains zinc material in the vapor phase in the receiving spaces of the receptacles 20 and supplies it into the discharge channels 25. In the discharge channels 25, the mixture of inert gas and zinc vapor is transported through the channel 12 toward the bottom of the crucible 14. As a result of the permanent inflow of inert gas from the inert gas source 60, an overpressure is created with respect to the pressure in the collection vessel 31 of the condenser 30. This assists in forcing the gas mixture out of the reaction space through the vapor pipe 11.

The vapor mixture flows into the collection vessel 31 via the heating pipe 11.3. The heating device 15 prevents zinc material from the zinc vapor from condensing in the area of the heating pipe 11.3. This reliably ensures that the zinc material enters the collection vessel 31 in the vapor phase.

The heating device 33 of the condenser 30 is used to set the temperature level such that the zinc material precipitates and collects in the collection vessel 31. In that way, the heating device 33 controls the temperature such that the zinc material is collected in the liquid form in the condenser 30, if possible.

The permanent inflow of inert gas into the reaction space also increases the pressure in the condenser 30. A pressure valve is provided to prevent excessive backpressure from building up in the collection vessel 31. When an upper threshold is reached, this pressure valve opens to discharge inert gas from the collection vessel 31 into the environment. Preferably, the pressure valve is part of the separator 40. When the pressure in the collection vessel 31 drops again to a lower threshold value, the pressure valve is closed again. The inert gas exits the separator 40 via the inert gas discharge line 42.

A temperature sensor is preferably assigned to the vapor pipe 11. This temperature sensor directly or indirectly measures the temperature of the gas mixture routed through the vapor pipe 11. As long as zinc vapor is entrained with the inert gas flow through the vapor pipe 11, a high temperature results in the heating pipe 11.3. If the zinc content entrained with the inert gas flow becomes smaller, the temperature in the heating pipe 11.3 drops. If the temperature drops, the heater 50 introduces additional heat into the heating pipe 11.3 to prevent the zinc from condensing. The temperature drop can be used to determine whether zinc material is still being transported out of the receptacles 20. If no more zinc material is transported away, the system can preferably be purged using an inert gas and then the process can be completed in a controlled manner.

Finally, the split hard metal can be removed from the receptacles 20 and sent on for further treatment. For instance, the hard metal can then be ground in a suitable mill. It can then be used again for the production of new hard metal bodies. The process according to the invention can be used to recycle hard metal with a residual zinc content of less than 50 ppm.

According to the invention, a process is provided for processing hard metal scrap, wherein the hard metal is alloyed with a low-melting alloy metal, for instance zinc, in the reaction space of the reactor 10 with the addition of heat. The resulting alloy metal is then converted to a vapor phase in the presence of inert gas, and then the alloy metal is at least partially condensed in a condensation step. The process is performed in such a way that there is an overpressure in the reaction space compared to the ambient pressure, at least during the condensation phase. During the condensation phase, inert gas is supplied to the reaction space via the inert gas supply line 61 at least temporarily from the inert gas source 60 disposed outside of the reaction space. In addition, in that way the inert gas is discharged out of the condenser 30 into the environment at least at certain intervals during the condensation phase.

The invention claimed is:

1. A method for processing metal carbide, comprising:

alloying the metal carbide with a low-melting point alloy metal in a reaction space of a reactor under a supply of heat;

providing an inert gas to the reaction space with an inert gas supply line from an inert gas source disposed outside of the reaction space;

converting the alloy metal into a vapor phase in the presence of the inert gas in the reaction space;

conducting a vapor mixture including the inert gas and the vapor phase of the alloy metal from the reaction space to a condenser with a vapor conduit;

condensing at least partially the vapor phase of the alloy metal in the condenser;

discharging the inert gas from the condenser at least at intervals during the condensing step; and maintaining an overpressure in the reaction space relative to an ambient pressure of an environment exterior of the reactor at least during the condensing step.

2. The method of claim 1, wherein:

the overpressure relative to ambient pressure is in a range of from 1 mbar to 90 mbar.

3. The method of claim 1, further comprising:

prior to the alloying step, flushing air from the reaction space by introducing inert gas from the inert gas source into the reaction space so that the inert gas displaces the air present in the reaction space;

venting the air into the environment through a closable opening; and then closing the closable opening.

4. The method of claim 1, further comprising:

heating a heating conduit section of the vapor conduit.

5. The method of claim 1, wherein:

the step of discharging the inert gas from the condenser includes discharging the inert gas into the environment and expanding the inert gas to the ambient pressure of the environment.

6. The method of claim 1, wherein:

the step of discharging the inert gas from the condenser includes compressing the inert gas and recirculating the inert gas to the reaction space.

7. The method of claim 1, wherein:

the step of discharging the inert gas from the condenser includes discharging the inert gas into a separator and separating remaining residual alloy metal from the inert gas in the separator.

8. The method of claim 1, wherein:

in the alloying step one or more receptacles are disposed in the reaction space, each receptacle including a receiving space for receiving the metal carbide, the one or more receptacles each including at least one flow channel forming a spatial connection between the receiving space and a gas-conveying area of the reactor located outside the receiving space such that the inert gas is supplied by the at least one flow channel to the receiving space and the inert gas is discharged from the receiving space together with the vapor phase of the alloy metal.

9. The method of claim 8, wherein:

each of the one or more receptacles includes a bottom and a perimetral wall rising from the bottom, the wall including a rim facing away from the bottom, the rim having a plurality of cut-outs formed therein to provide the at least one flow channel.

10. The method of claim 9, wherein:

each of the cut-outs has a cross-section area in a range of from 1 square mm to 30 square mm.

11. The method of claim 8, wherein:

the one or more receptacles comprises a plurality of receptacles and each receptacle of the plurality of receptacles includes a discharge channel communicated with the receiving space, and a plurality of the receptacles are superposed such that the discharge channels of the superposed receptacles are aligned with each other, and a line section of the vapor conduit is routed through the aligned discharge channels such that an annular channel is left between an outer wall of the line section and the aligned discharge channels for discharging the inert gas and the vapor phase of the alloy metal from the receiving spaces of the receptacles.

12. The method of claim 1, wherein:

the inert gas supply line includes an opening which opens into an upper area of the reaction space, and the vapor conduit includes a conduit inlet disposed in the reaction space at a vertical height below the opening of the inert gas supply line.

13. The method of claim 12, wherein:

the condenser includes a cup-shaped collection vessel, and the vapor conduit opens into the cup-shaped collection vessel.

14. The method of claim 1, wherein:

the discharging step includes discharging the inert gas from the condenser with a pressure valve in communication with a gas-conveying area of the condenser when a pressure in the gas-conveying area exceeds a pressure threshold value.

15. The method of claim 14, wherein:

the step of discharging the inert gas from the condenser includes discharging the inert gas into a separator and separating remaining residual alloy metal from the inert gas in the separator, and the pressure valve is disposed downstream of the separator.

* * * * *